United States Patent [19]

Somerville

[11] Patent Number: 5,598,086
[45] Date of Patent: Jan. 28, 1997

[54] PEAK VOLTAGE AND PEAK SLOPE DETECTOR FOR A BATTERY CHARGER CIRCUIT

[75] Inventor: Thomas A. Somerville, Chandler, Ariz.

[73] Assignee: Motorola, Inc., Schaumburg, Ill.

[21] Appl. No.: 510,999

[22] Filed: Aug. 3, 1995

[51] Int. Cl.[6] .................................................. H02J 7/04
[52] U.S. Cl. ................ 320/30; 320/39; 324/433; 340/635
[58] Field of Search ................................ 320/22, 32, 33, 320/39; 324/433, 436; 340/635, 636

[56] References Cited

U.S. PATENT DOCUMENTS

| | | | |
|---|---|---|---|
| 4,091,320 | 5/1978 | Foster | 320/40 |
| 4,213,081 | 7/1980 | Taylor | 320/40 |
| 4,309,644 | 1/1982 | Reimers et al. | 318/139 |
| 4,746,854 | 5/1988 | Baker et al. | 320/40 |
| 4,918,368 | 4/1990 | Baker et al. | 320/40 |
| 5,013,992 | 5/1991 | Eavenson et al. | 320/31 |
| 5,111,131 | 5/1992 | Somerville | 320/32 |
| 5,146,395 | 9/1992 | McKie | 363/13 |
| 5,157,320 | 10/1992 | Kuriloff | 320/39 |
| 5,304,917 | 4/1994 | Somerville | 320/32 |
| 5,432,429 | 7/1995 | Armstrong, II et al. | 320/43 |

*Primary Examiner*—Peter S. Wong
*Assistant Examiner*—Gregory J. Toatley, Jr.
*Attorney, Agent, or Firm*—Harry A. Wolin; Gary W. Hoshizaki

[57] ABSTRACT

A peak voltage and peak slope detector circuit (41) of high resolution is disclosed for sensing a battery voltage during a battery charging sequence. Battery charging circuitry is disabled when a battery voltage is being sampled to eliminate error due to noise. The battery voltage is sampled at predetermined intervals for a predetermined time period which is determined by a sample timer (46). A Voltage To Frequency Converter (42) converts the battery voltage to a signal. The signal frequency corresponds to the magnitude of the battery voltage. The number of pulses output by the VFC (42) are counted during the predetermined time period. The number of pulses are counted and compared against a previous sample by a counter comparator (44) to determine peak voltage. The peak voltage occurs when the sampled count is less than the previous sample count. The rate of change of the battery voltage is monitored by a second counter comparator (47) for determining peak slope during the battery charging sequence.

19 Claims, 3 Drawing Sheets

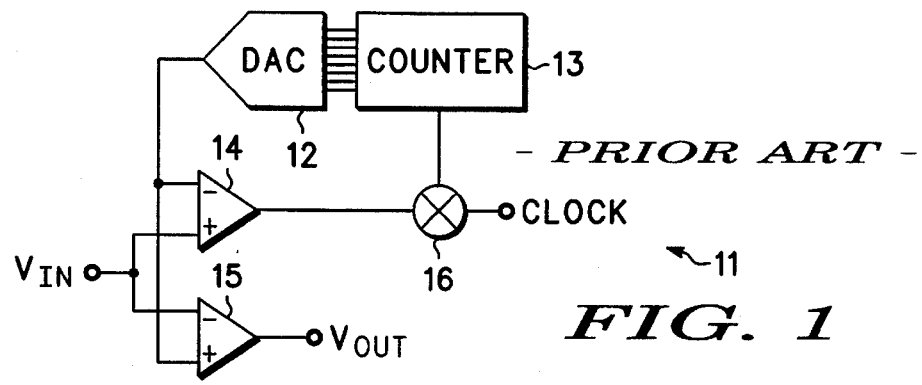
*FIG. 1* — PRIOR ART
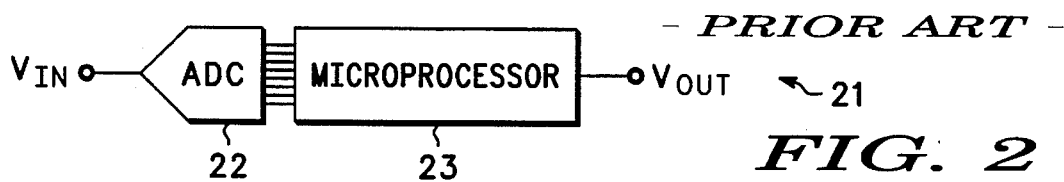
*FIG. 2* — PRIOR ART
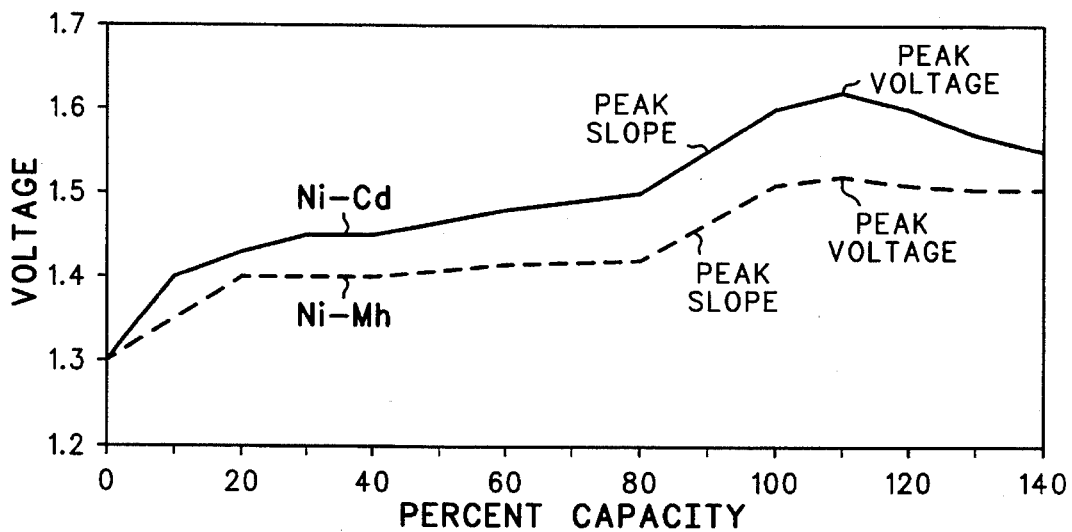
*FIG. 3*
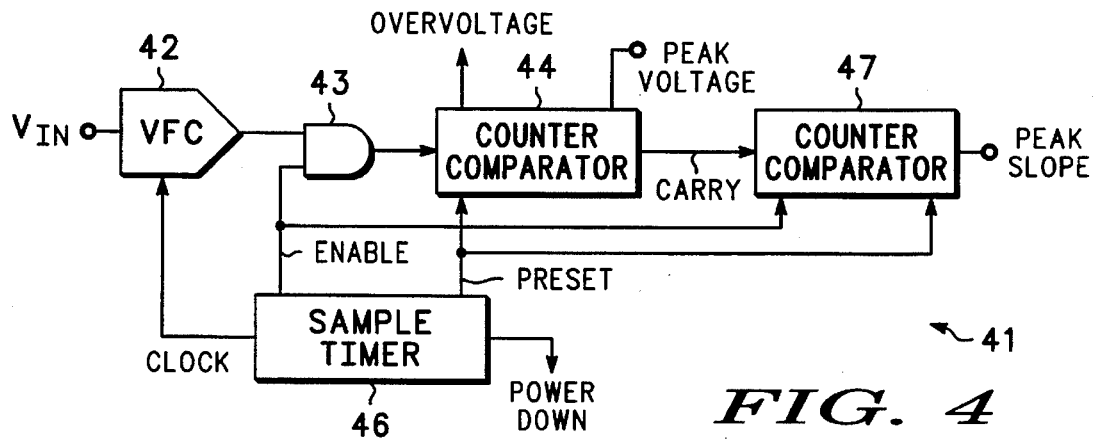
*FIG. 4*

PEAK VOLTAGE AND PEAK SLOPE DETECTOR FOR A BATTERY CHARGER CIRCUIT

BACKGROUND OF THE INVENTION

This invention relates, in general, to battery charger circuits, and more particularly, to peak voltage and peak slope detector circuits for a battery charger circuit.

Portable electronics such as a CD player, cellular phone, or power tool are powered by battery. Non-rechargeable batteries are not cost efficient for electronic systems that are in constant use. Rechargeable batteries are a popular and cost effective alternative to power most types of electronics. Many different types of rechargeable batteries are currently offered such as Alkaline, Nickel-Cadmium (NiCd), and Nickel Metal Hydride (NiMH).

In general, rechargeable batteries are recharged by applying a voltage and current for a predetermined time period. Different battery types have different charging requirements but most can be damaged or have a reduced life when charged improperly. A correct charging procedure requires sensitive circuitry that monitors both battery voltage and current. Typically, a battery charger circuit is designed to automatically shut off when the batteries being charged are fully charged which maximizes the power delivered by the batteries and the number of times they can be recharged.

It would be of great benefit if a circuit could be provided that accurately senses a peak voltage or peak slope of a battery being charged to accurately determine optimum charging of a battery to insure maximum performance and longevity of a battery.

BRIEF DESCRIPTION OF THE DRAWINGS

FIG. 1 is a prior art peak voltage detector circuit for a battery charger;

FIG. 2 is a prior art peak voltage and peak slope detector circuit for a battery charger;

FIG. 3 is a graph of two common rechargeable batteries illustrating a charge profile during a battery charging sequence;

FIG. 4 is a block diagram of a peak voltage and peak slope detection circuit in accordance with the present invention;

DETAILED DESCRIPTION OF THE DRAWINGS

Figure 5:
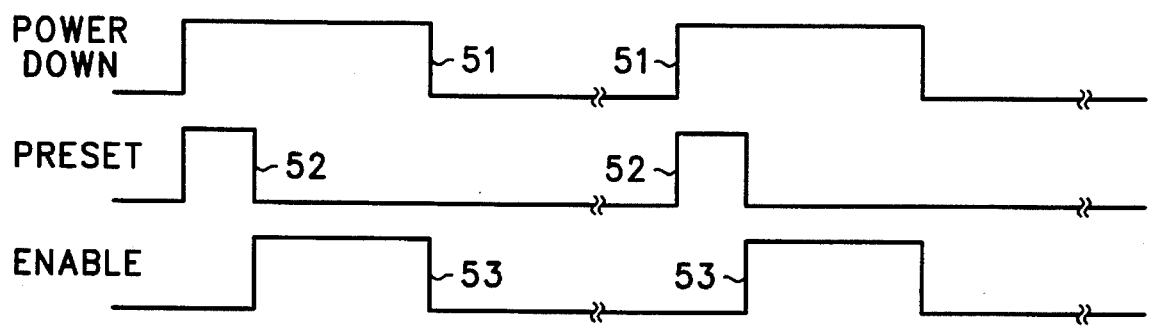
FIG. 5 is a timing diagram illustrating the output signals provided by the sample timer of FIG. 4 in accordance with the present invention.

Charging a rechargeable battery for maximum battery life and power output requires a circuit that detects either a peak voltage or a peak slope during a battery charging sequence. A charging battery has a voltage that increases monotonically until a peak voltage or maximum voltage is attained. Further charging after the peak voltage actually reduces the output voltage of the battery. A peak slope of a battery charge profile is an area of the curve where the battery voltage has the greatest rate of voltage change.

In general, a peak slope occurs before a peak voltage during a battery charging sequence. Two different schools of thought apply when selecting a recharging technique. Charging a battery to a peak voltage insures the battery will deliver maximum power to a load for the longest time period. A peak voltage is detected when a previous sampled voltage is greater than the immediate battery voltage thus a battery charger using peak voltage detection slightly overcharges the battery. Longevity, or the number times a battery can be recharged may be reduced using this technique.

Peak slope detection insures that a battery is not overcharged since it occurs before a peak voltage. The rate of change in battery voltage during recharging is monitored and a peak rate of change detected. Peak slope detection is preferred for lightly loaded batteries that require maximum battery life. Original Equipment Manufacturers (OEM) of battery charger circuits require that an integrated circuit be provided that is configurable for either peak voltage or peak slope detection. Furthermore, the sensitivity of a peak voltage or peak slope detector circuit is critical to performance. A detector circuit having high resolution for detecting voltage changes will enhance the power output, the time between recharges, and the recharge life of a battery. Another factor in the design of a detector circuit is cost, a detector circuit that is cheaper to manufacture yet provides better performance is very attractive to an OEM of battery chargers.

FIG. 1 is a schematic diagram of a prior art "ratchet" Digital to Analog Converter (DAC) peak voltage detector circuit 11 used in battery charger circuits. Peak voltage detector circuit 11 is limited to peak voltage detection and is not used to detect peak slope. Peak voltage detector circuit 11 comprises a DAC 12, a counter 13, a comparator 14, a comparator 15, and logic circuitry 16.

An input Vin is coupled to a non-inverting input of comparator 14 and an inverting input of offset comparator 15. The input Vin of peak voltage detector circuit 11 is coupled to a battery or batteries being charged for sensing battery voltage during a battery charging sequence. Logic circuitry 16 has an input coupled to an output of comparator 14, a clock input coupled for receiving a clock signal, and an output. Counter 13 has an input coupled to the output of logic circuitry 16 and a plurality of outputs. Counter 13 provides a digital output that incrementally increases DAC 12 via the clock signal. DAC 12 has a plurality of inputs coupled to the plurality of outputs of counter 13 and an output coupled to an inverting input of comparator 14 and a non-inverting input of offset comparator 15. A logic one level provided at an output Vout of offset comparator 15 indicates a peak voltage is detected and disables the battery charging sequence.

A battery charging sequence monotonically increases a battery voltage until a peak voltage occurs, after which the battery voltage decreases in voltage. Peak voltage detector circuit 11 compares the battery voltage against a previous sampled battery voltage (provided by DAC 12). A peak voltage is detected when the battery voltage is less than an output voltage of DAC 12. For example, prior to a battery charging sequence counter 13 is reset to a zero count. DAC 12 outputs zero volts with a zero count digital input from counter 13. Comparator 14 compares the battery voltage applied to input Vin against the output voltage of DAC 12. If the battery voltage is greater than the output voltage of DAC 12 comparator 14 outputs a logic one level that enables logic circuitry 16 to provide a clock signal to counter 13. Counter 13 is incremented which increases the output voltage of DAC 12 by a LSB voltage. Comparator 14 and logic circuitry 16 continues to allow clock pulses to increment counter 13 until the output voltage of DAC 12 is greater than the battery voltage. Each clock pulse increases the output voltage of DAC 12 by an LSB voltage. A difference voltage between the battery voltage and the output voltage of DAC 12 is less than or equal to a LSB voltage of DAC 12 when the output voltage of DAC 12 is greater than the battery voltage. If the battery voltage is less than the output voltage of DAC 12, comparator 14 outputs a logic zero level. A logic zero level output by comparator 14 disables logic circuitry 16 from providing a clock signal to counter 13. The output voltage of DAC 12 stays constant until the battery voltage increases greater than the output voltage of DAC 12 due to battery charging.

Offset comparator 15 outputs a logic zero level as the battery voltage rises during the battery charging sequence. Offset comparator 15 has a built in voltage offset that is greater than an LSB voltage of DAC 12. The offset voltage allows offset comparator 15 to maintain a logic zero level output when the output voltage of DAC 12 is greater than the battery voltage but within a LSB voltage of the battery voltage. During the battery charging sequence the battery voltage will peak at some point and start to fall as the battery is overcharged. Offset comparator 15 outputs a logic one level when the voltage difference between the output voltage of DAC 12 is greater than the voltage offset of offset comparator 15. The logic one level signifies the battery charging sequence is over.

The accuracy of peak voltage detect circuit 11 is limited by the resolution of DAC 12 and the offset voltage of comparator 15. Utilizing a DAC with a smaller LSB voltage will reduce the amount of overcharging after the peak voltage if the offset voltage of comparator 15 is also reduced. Peak voltage detect circuit 11 is also susceptible to noise coupled to input Vin. A battery charging sequence produces both current and voltage spikes on the battery that can produce false triggering of comparator 14 and offset comparator 15. A filter is sometimes employed at the input Vin to reduce noise problems.

FIG. 2 is a schematic diagram of a prior art microprocessor or microcontroller based peak voltage and peak slope detection circuit 21 for a battery charger. Peak voltage and peak slope detection circuit 21 comprises an Analog to Digital Converter (ADC) 22 and a microprocessor 23. A battery being charged is coupled to an input Vin for sensing a battery voltage. ADC 22 converts the analog voltage to a corresponding digital number that is coupled to microprocessor 23. Typically, a battery voltage is sampled at predetermined time intervals. The sampled voltage values are stored in memory of the microprocessor for analysis. Microprocessor 23 includes a software program for analyzing the sampled battery voltages to determine either peak voltage or peak slope.

Accuracy of peak voltage and peak slope detection circuit 21 is limited by ADC 22. Typically, an 8 bit ADC is used which has a resolution of approximately 8 millivolts with a 2 volt full scale voltage. An 8 bit ADC is not accurate enough for a rechargeable battery such as a Nickel Metal Hydride battery since it produces smaller voltage changes during a charging sequence when compared to other battery types. Increasing the resolution of ADC 22 will improve performance of peak voltage and peak slope detection circuit 21 but at a higher cost. A 10 bit monotonic (highly linear) ADC would greatly increase the cost of peak voltage and peak slope detection circuit 21. Moreover, a microprocessor based peak voltage and peak slope detection circuit is inherently more expensive than other corresponding circuits (for example the circuit shown in FIG. 1) due to sophistication of the circuitry. As shown in FIG. 2, peak voltage and peak slope detection circuit 21 is sensitive to noise introduced during a battery charging sequence. Any noise introduced during a sampling process at input Vin is added to the output of ADC 22. A filter (not shown) is typically employed at the input to ADC 22 to remove noise.

FIG. 3 is a graph of a charge profile of two battery types, Nickel Cadmium (Ni—Cd) and Nickel Metal Hydride (Ni—Mh) during a battery charging sequence. The graph illustrates battery voltage versus percent charge capacity. Note that a battery can be charged greater than 100 percent capacity. In general, batteries are rated in ampere/hours which is the amount of current the battery can deliver in a defined time period. One hundred percent capacity corresponds to the battery rating listed by the manufacturer. A battery capacity is typically underrated by the manufacturer which allows a battery to be charged to greater than its rating. In other words a battery charged to more than 100 percent capacity will deliver more current than the manufacturers ampere/hour rating.

Curves for both Ni—Cd and Ni—Mh batteries are similar in shape. Ni—Cd batteries charge to a higher voltage than Ni—Mh. A problem with Ni—Mh batteries is the smaller rate of change that occurs at a peak voltage and a peak slope. A higher resolution circuit is required to detect the voltage changes of a Ni—Mh battery to insure correct charging. Overshooting a peak voltage which may substantially charge a battery greater than 100 percent capacity will produce excess power dissipation within the battery which reduces battery life (the number of times the battery can be recharged). For example, the peak voltage of the Ni—Mh battery occurs in a relatively flat portion of the curve which could produce a significant overcharging if a peak voltage and peak slope detect circuit cannot resolve small changes in battery voltage. A similar case can be made for a peak slope measurement where the rate of voltage change is small during a battery charging sequence.

A peak voltage and peak slope detector circuit is disclosed herein that has increased resolution to prevent battery overcharging. In the preferred embodiment, a resolution of two millivolts is achieved which greatly reduces overcharging when compared to other systems with less resolution charging Ni—Mh batteries. Higher resolution is easily achieved using the same circuitry if required. The peak voltage and peak slope detector circuit also reduces manufacturing costs by eliminating costly components such as a microprocessor, DAC, or ADC.

An increase in resolution is achieved by eliminating the use of digitizing elements such as an ADC or DAC and using a Voltage to Frequency Converter (VFC) circuit. A VFC receives an input voltage and produces a signal having a frequency that corresponds to the magnitude of the input voltage. In the preferred embodiment, a battery voltage is sampled for a predetermined time period and the number of pulses from a VFC are counted and compared with a previous sampled battery voltage. Both the peak voltage and the peak slope is accurately detected via this comparison. Resolution is increased by changing the frequency or the sample time period.

FIG. 4 is a block diagram of a peak voltage and peak slope detector circuit 41 for a battery charger circuit that has higher resolution and significantly reduces manufacturing costs. A charging process for a battery, for example a Ni—Cd or Ni—Mh battery increases monotonically until a peak voltage is reached at which point further charging reduces the battery voltage. Referring to FIG. 3 it can be seen that the slope or rate of change of the battery voltage varies at different points on the curve. Referring back to FIG. 4, a peak slope occurs when a battery is first charged, but this is not a peak slope that is detected by peak voltage and peak slope detector circuit 41. The peak slope to be detected is the portion of the curve having the greatest rate of change which occurs before the peak voltage of the charging profile. The initial charging period of a battery charging sequence is ignored for peak slope detection. Peak slope occurs in a battery charge profile somewhere between 80 and 100 percent charge capacity. Peak slope detection does not overcharge a battery significantly, thus the battery life is extended.

Peak voltage and peak slope detector 41 comprises a Voltage To Frequency Converter (VFC) 42, an AND gate 43, a counter comparator 44, a sample timer 46, and a counter comparator 47. VFC 42 has a first input coupled to an input Vin, a second input, and an output. AND gate 43 has a first input coupled to the output of VFC 42, a second input, and an output. Counter comparator 44 has a first input coupled to the output of AND gate 43, a second input, an Overvoltage output, a Peak Voltage output, and a Carry output. Counter comparator 47 has a first input coupled to the Carry output of counter comparator 44, a second input, a third input, and a Peak Slope output. Sample timer 46 has a Power Down output, a Clock output coupled to the second input of VFC 42, an Enable output, and a Preset output.

A battery voltage is applied to the input Vin of VFC 42 for sampling the voltage. Prior to sampling a battery voltage, sample timer 46 provides a Power Down signal at the Power Down output that turns off the battery charging circuitry. The battery charger is turned off to reduce noise induced during a charging process thereby yielding a more accurate voltage sample. It should be noted that a battery charging sequence occurs over a long period of time. A Ni—Mh battery for a cellular phone typically charges in one to two hours. Referring back to FIG. 3 the battery voltage changes approximately 200 millivolts in an hour time period which on average yields a change of 3.33 millivolts per minute. In the preferred embodiment, a voltage sample of a charging battery is taken at 10 second intervals.

Referring back to FIG. 4, sample timer 46 provides a Preset pulse at the Preset output during a voltage sampling sequence to counter comparators 44 and 47 for down loading a count from a previous voltage sample to a down counter within each counter comparator. Counter comparators 44 and 47 compare data from a previous voltage sample against the immediate battery voltage for determining peak slope or peak voltage. After a Preset pulse, sample timer 46 provides an Enable pulse at the Enable output for starting a voltage sampling sequence. An Enable pulse is delayed from the Power Down pulse to insure the battery voltage is stabilized at the Vin input of VFC 42.

In the preferred embodiment, VFC 42 is a synchronous Voltage to Frequency Converter. Sample Timer 46 provides a Clock signal at the Clock output to VFC 42 to synchronize the timing within peak voltage and peak slope detector 41 to insure accurate counts by counter comparators 44 and 47. VFC 42 outputs a VFC signal having a frequency that corresponds to the battery voltage applied to the Vin input. The VFC signal is coupled to an input of AND gate 43 and is gated through AND gate 43 during the Enable pulse from sample timer 46.

A time period of the Enable pulse from sample timer 46 is chosen such that a maximum voltage corresponding to a maximum number of pulses from VFC 42 is countable by counter comparator 44. For example, assume VFC 42 has a maximum input voltage of 2 volts which corresponds to a maximum frequency of 52 kilohertz. If counter comparator 44 is capable of counting a maximum of 1024 pulses ($2^{10}$) a period of approximately 20 milliseconds (pulse width of the pulse at the Enable output) is required to capture the maximum input voltage. Each pulse counted during a voltage sample corresponds to a voltage of (2 volts/1024 pulses) approximately 1.953 millivolts. The accuracy or resolution of peak voltage and peak slope detector 41 is increased by increasing the number of pulses corresponding to the maximum voltage.

Counter comparator 44 counts a number of pulses during a voltage sampling sequence which corresponds to a battery voltage at input Vin. The number of pulses is compared against a previous count. Three events are possible during a voltage sampling sequence. First, the number of pulses remains the same between voltage samples which corresponds to a case when the battery voltage has stayed approximately the same. This typically occurs during flat portions or slow charging areas of the charge profiles shown in FIG. 3. Second, the number of pulses increases between voltage samples which corresponds to a case when the voltage increases. This occurs during areas of the charge profile having high rates of change. Third, the number of pulses decreases between voltage samples which corresponds to a case that a peak voltage is detected and counter comparator 44 outputs a Peak Voltage signal at the Peak Voltage output for stopping a battery charge sequence. A voltage decrease implies that the monotonically increasing charge profile of a battery has stopped and overcharging has begun.

An overvoltage condition corresponds to a battery voltage that exceeds the maximum input voltage of VFC 42. An overvoltage condition is flagged when the counter of counter comparator 44 exceeds a predetermined number. An Overvoltage signal is output at the Overvoltage output of counter comparator 44 for stopping a battery charging sequence.

Peak slope is detected by counter comparator 47 which monitors the rate of change of voltage via a Carry output of counter comparator 44. Peak slope detection identifies the area of the fastest rate of voltage change which occurs before a voltage peak. In the preferred embodiment, the initial charge period of the charge profile is ignored in peak slope detection due to the high rate of change in voltage as a depleted battery is first charged. The initial charge period can be ignored by several methods. A first method is to delay peak slope detection for a time period that extends past the initial charging period of a depleted battery. A second method is to detect the flat or slow rate of voltage change portion of a battery charge profile and begin peak slope detection. A third method is to start peak slope detection after the battery exceeds a predetermined voltage.

Peak slope is detected using counter comparator 47 in a similar fashion as counter comparator 44 detects peak voltage. The slope or rate of voltage change should continue to increase during a battery charging process until a point prior to the peak voltage. Counter comparator 47 compares the rate of voltage increase against the previous rate of voltage increase. An increase or same rate of change should be detected until slightly prior to the peak voltage. A Carry signal at the Carry output of comparator 44 indicates an increase in battery voltage over a previous voltage sample. As mentioned previously, the rate of voltage change in a charging battery is small. In the preferred embodiment, a larger, more detectable, voltage change is produced by increasing the time period between comparisons by counter comparator 47. In the preferred embodiment, the number of Carry signals are counted over a predetermined number of battery voltage samples and compared against a previous count of Carry signals A larger number of Carry signals in the immediate count indicates an increase in the battery rate of change. A same number of Carry signals as a previous count of Carry signals indicates the rate of change is approximately the same. A smaller number of Carry signals than the previous Carry signal count indicates a peak slope has been detected. Counter comparator 47 outputs a Peak slope signal at the Peak Slope output indicating peak slope has occurred when the decrease in the rate of change in voltage is detected.

FIG. 5 is a timing diagram of the signals provided by sample timer 46 of FIG. 4 at the Preset output, Power Down output, and the Enable output. In the preferred embodiment, the signals at the Power Down, Preset, and Enable outputs occur at 10 second intervals. The actual peak voltage and peak slope detection period is only a small fraction of a charge cycle. Peak voltage and peak slope detection occur during Pulses 51 at the Power Down output. In particular, pulses 51 disable the battery charging circuitry. Pulses 52 at the Preset output allow the previous count in either counter comparators 44 and 47 of FIG. 4 to be down loaded to a counter prior to a battery voltage sample. A comparison of the immediate battery voltage and the previous battery voltage occurs during Pulses 53. Pulses 53 are delayed from the rising edge of pulses 51 to allow for the battery charging circuitry to be turned off and the battery voltage to stabilize. The period of pulses 53 must be of sufficient length for the counter of counter comparator 44 of FIG. 4 to count a number of pulses corresponding to a maximum voltage applied to the input Vin of VFC 42 of FIG. 4.

Figure 6:
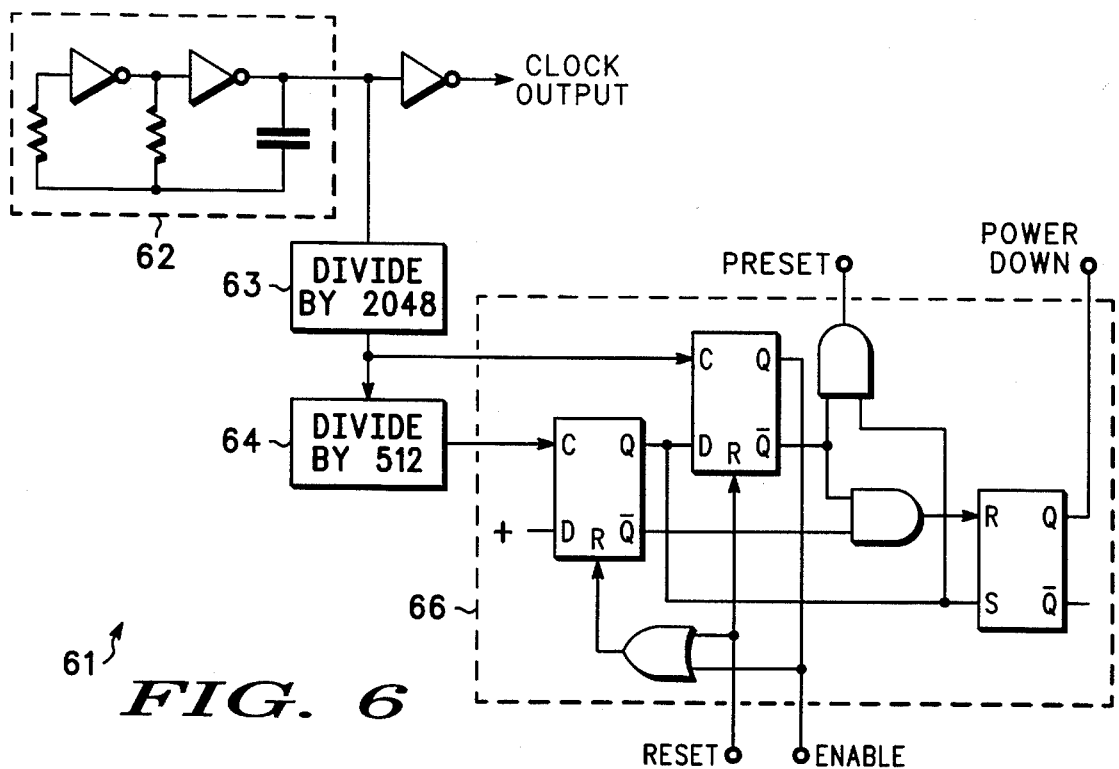
FIG. 6 is a schematic diagram of a sample timer for producing output signals corresponding to FIG. 5.

FIG. 6 is a schematic diagram of a sample timer 61 corresponding to sample timer 46 of FIG. 4 for generating a timing sequence as shown in FIG. 5. Timing circuits are well known by one skilled in the art, it should be obvious that other timing circuits having different circuit configurations are easily generated that produce similar timings. An oscillator 62 produces a constant frequency signal. In the preferred embodiment, oscillator 62 provides a 104 kilohertz signal that is provided at a Clock output. Divider circuits 63 and 64 reduce the frequency of the signal. A signal having a 20 millisecond period is provided at an output of divider circuit 63. A signal having a 10 second period is provided at an output of divider circuit 64. Circuitry 66 generates signals corresponding to the timing diagram of FIG. 5 at a Preset output, an Enable output, and a Power Down output. A reset input to circuitry 66 is used to reset D-flip flops contained therein.

Figure 7:
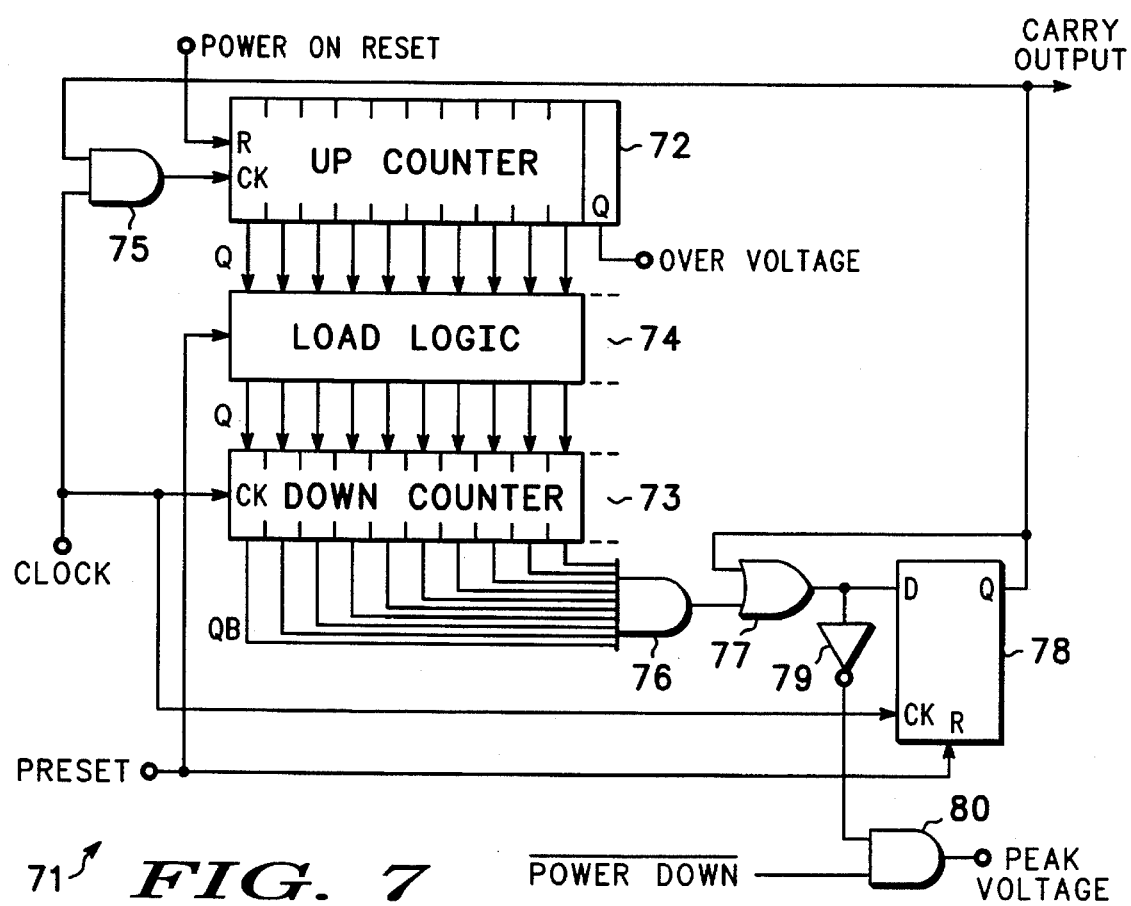
FIG. 7 is a schematic diagram of a counter comparator for peak voltage detection corresponding to the counter comparator of FIG. 4 in accordance with the present invention.

FIG. 7 is a schematic diagram of a counter comparator 71 corresponding to counter comparator 44 of FIG. 4. Counter comparator 71 comprises an up counter 72, a down counter 73, load logic 74, AND gates 75, 76, and 80, an OR gate 77, a D-flip flop 78, and an inverter 79. Counter comparator 71 has a Clock input, a Power Down Bar input, a Preset input, a Peak Voltage output, an Overvoltage output, and a Carry output.

AND gate 75 has a first input coupled to the Clock input, a second input, and an output. Up counter 72 has a clock input coupled to the output of AND gate 75, and an output coupled to the Overflow output. In the preferred embodiment, up counter 72 is capable of counting a predetermined number of pulses corresponding to a maximum input voltage during a voltage sampling period. An additional overvoltage flip flop is added to up counter 72 that provides an Overvoltage signal at the Overvoltage output for turning off the battery charging circuit when the maximum input voltage is exceeded.

Load logic 74 is circuitry for loading a count from up counter 72 to down counter 73. In the preferred embodiment, down counter 73 includes set and reset inputs for setting it to a predetermined count. Load logic 74 includes logic circuitry for setting or resetting each output of down counter 73 to a logic state of a corresponding output of up counter 72. A Preset signal applied to the Preset input enables load logic 74 for loading (or setting) the count stored in up counter 72 to down counter 73.

In the preferred embodiment, both up counter 72 and down counter 73 are a string of serial coupled flip flops that respectively increment and decrement a count. Down counter 73 has a clock input and a QB output from each flip flop. AND gate 76 has an input coupled to each QB output of down counter 73 and an output. OR gate 77 has a first input coupled to the output of AND gate 76, a second input, and an output. D-flip flop 78 has a D-input coupled to the output of OR gate 77, a CK input coupled to the Clock input, a R(reset) input coupled to the Preset input, and a Q output coupled to the Carry output, the second input of AND gate 75 and the second input of OR gate 77. Inverter 79 has an input coupled to the output of OR gate 77 and an output. AND gate 80 has a first input coupled to the output of inverter 79, a second input coupled to the Power Down Bar input, and an output coupled to the Peak Voltage output.

Operation of counter comparator 71 operates using the timing generated by sample timer 46 of FIG. 4 as shown in the timing diagram of FIG. 5. A Power Down Bar signal coupled to the Power Down Bar input is a complement of the Power Down signal shown in FIG. 5. AND gate 80 is disabled from providing a Peak Voltage output signal until the end of a voltage sampling sequence. A Preset signal applied to the Preset input down loads a count from up counter 72 to down counter 73. The Preset signal also resets D-flip flop 78. A count stored in up counter 72 prior to the voltage sampling sequence corresponds to a previous sampled battery voltage. The only exception is on an initial voltage sample of a battery charging process where up counter 72 is reset to all zeros (zeros are then down loaded to down counter 73). The previous count is retained in up counter 72 after it is down loaded to down counter 73.

Down counter 73 is decremented by a Voltage to Frequency Converter (VFC) signal applied to the Clock input. The Clock input receives pulses from a VFC that corresponds to the present battery voltage. The present battery voltage is identical to the previous battery voltage if down counter 73 decrements to a zero count. The QB outputs of each flip flop of down counter 73 outputs a logic one level at the zero count which produces a logic one level at the outputs of AND gate 76 and OR gate 77. All other counts of down counter 73 produce at least one logic zero level at a QB output that generates a logic zero level at the output of AND gate 76. Additional VFC pulses are applied to the Clock input if the battery voltage being sampled is larger than the previous sampled battery voltage. The next pulse applied to the Clock input after a zero count has occurred causes D-flip flop 78 to output a logic one level which is coupled to the Carry output and AND gate 75. AND gate 75 is then enabled to increment up counter 72 via the pulse applied to the Clock input. Each pulse after the zero count increments up counter 72 thereby updating up counter 72 to a pulse count corresponding to the battery voltage being sampled. The Q output of D-flip flop 78 is fedback to OR gate 77 to maintain the logic one level at the Q output during the voltage sampling sequence. AND gate 80 outputs a logic zero level after the voltage sampling sequence if the present battery voltage is larger or the same as the previous battery voltage.

A peak voltage is detected when the battery voltage being sampled is less than the previous sampled battery voltage. In this case, down counter 73 does not decrement to a zero count and the Carry output remains at a logic zero level. After the voltage sampling sequence, the output of OR gate 77 is at a logic zero level (both inputs are at a logic zero level) and inverter 79 outputs a logic one level. The Power Down Bar signal and the output of inverter 79 are at a logic one level producing a logic one level at the output of AND gate 80. The logic one level at the output of AND gate 80 indicates a peak voltage is detected. The high resolution of the voltage to frequency conversion minimizes overcharging of the battery after the peak voltage. The counter comparator accurately determines when a peak voltage occurs thereby eliminating the need for a costly microprocessor and software programming used in other detector systems.

Figure 8:
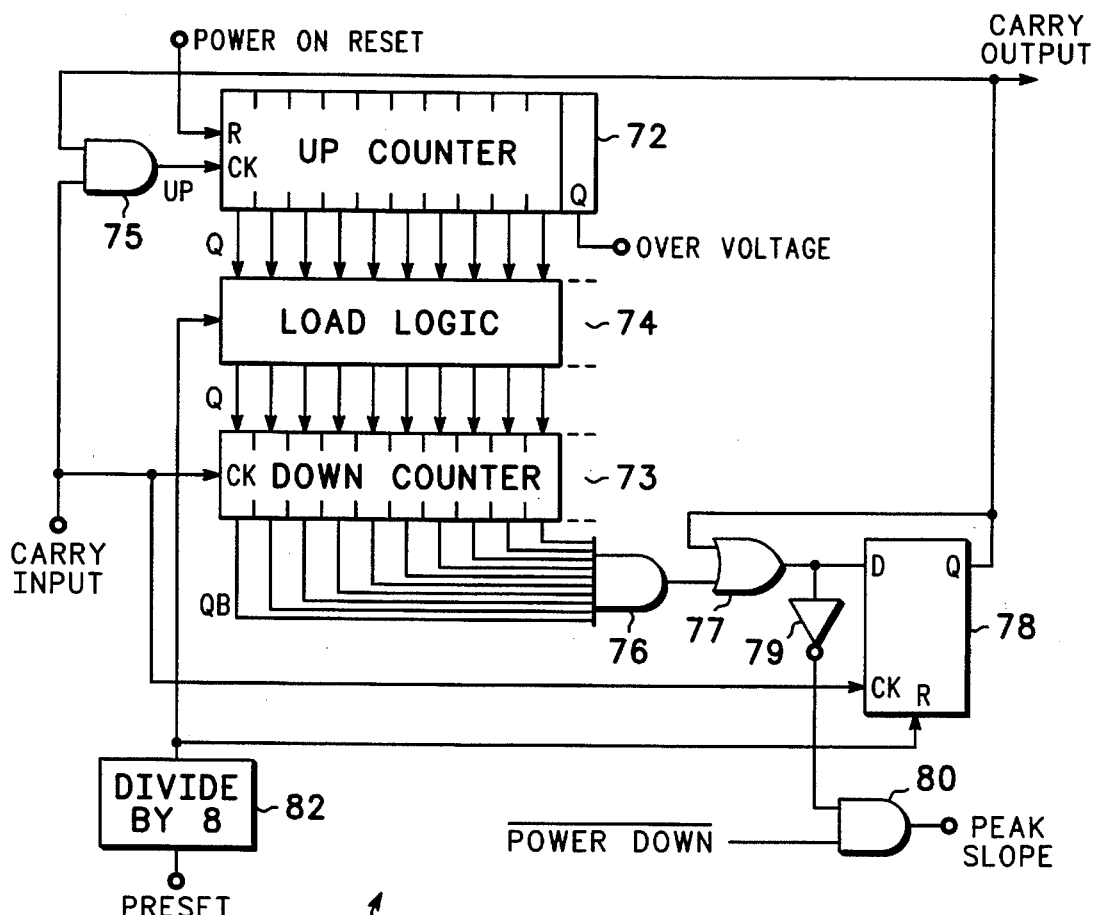
FIG. 8 is a schematic diagram of a counter comparator for peak slope detection corresponding to the counter comparator of FIG. 4 in accordance with the present invention.

FIG. 8 is a schematic diagram of a counter comparator 81 for peak slope detection. Counter comparator 81 operates and has circuitry similar to counter comparator 71 of FIG. 7 with some minor exceptions. The differences of counter comparator 81 and counter comparator 71 are described in detail. Counter comparator 81 compares a number of voltage changes (battery voltage) over a predetermined time period against a previous number of voltage changes of a previous time period. As mentioned previously the rate of voltage change during a battery charging sequence can be quite small. For example, if a voltage is being sampled every 10 seconds for peak voltage detection, the change in voltage between samples can be less than the resolution of the detection circuitry. The time between comparisons of voltage change is increased from the speed at which the voltage is sampled in the peak voltage detection process to insure a measurable voltage change occurs. In the preferred embodiment, a number of voltage changes is compared over eight times voltage sample periods of counter comparator 71. Divider 82 (divide by eight) couples to a Preset input of counter comparator 81 for increasing a period of a Preset signal. The Preset signal is provided at the output of divider 82 which down loads a count from an up counter to a down counter prior to a peak slope detection sequence.

The rate of voltage change of a battery voltage is measured using the Carry output of the peak voltage detect counter comparator to increment and decrement the up and down counters. A Carry signal from a peak voltage detect counter comparator indicates that a larger voltage was sensed during a voltage sample. In the preferred embodiment, eight voltage samples and comparisons occur during a peak slope detect sequence of counter comparator 81. Initially, a previous count of the number of Carry signals of a previous peak slope detect sequence in the up counter is down loaded to the down counter. The down counter is decremented with each Carry signal received from the peak voltage detect counter comparator. The rate of voltage change is the same if the down counter decrements to a zero count. The rate of voltage change has increased if the count is higher than the previous count. The up counter is enabled for increasing the count on the next Carry signal after the down counter has decremented to the zero count.

Peak slope is detected when the count of Carry signals is less than a previous count of Carry signals. A reduction in the number of Carry signals indicates a reduction in the amount of voltage change during the predetermined time period. The down counter does not decrement to a zero count under this condition which results in a logic one level being output at a Peak Slope output of counter comparator 81 indicating peak slope has been detected.

By now it should be appreciated that a peak voltage and peak slope detector circuit has been provided. The peak voltage and peak slope detector circuit reduces overcharging of a battery by detecting smaller changes in battery voltage. Manufacturing complexity and cost is reduced by eliminating costly microprocessors, ADC circuits, and DAC circuits used in other detector systems.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

I claim:

1. A peak voltage and peak slope detector circuit for a battery charger circuit comprising:
   a Voltage to Frequency Converter (VFC) responsive to a battery voltage for providing a VFC signal;
   a first counter comparator responsive to said VFC for generating a pulse count of said VFC signal during a predetermined time period wherein said pulse count corresponds to a voltage magnitude of said battery voltage and wherein said pulse count is compared against a previous pulse count to determine when a peak voltage occurs; and
   a timer circuit for gating said VFC signal to said first counter comparator for said predetermined time period.

2. The peak voltage and peak slope detector circuit as recited in claim 1 wherein said VFC is a synchronous VFC and is responsive to a clock signal provided by said timer circuit.

3. The peak voltage and peak slope detector circuit as recited in claim 1 wherein said first comparator comprises:
   an up counter for counting pulses of said VFC signal;
   a down counter; and
   a load logic circuit for coupling said up counter to said down counter.

4. The peak voltage and peak slope detector circuit as recited in claim 3 wherein prior to a battery voltage sample sequence said load logic circuit couples a pulse count of said up counter to said down counter for being stored therein, said pulse count of said up counter corresponding to said previous pulse count.

5. The peak voltage and peak slope detector circuit as recited in claim 4 wherein said down counter is responsive to said VFC signal during said battery voltage sample sequence, said down counter being decremented by said VFC signal during said predetermined time period.

6. The peak voltage and peak slope detector circuit as recited in claim 5 wherein said battery voltage is equal to a previous sampled battery voltage when said down counter decrements to a zero count.

7. The peak voltage and peak slope detector circuit as recited in claim 6 wherein said battery voltage is greater than a previous sampled battery voltage when said down counter decrements below a zero count and wherein a Carry signal is generated when said battery voltage is greater than said previous sampled battery voltage.

8. The peak voltage and peak slope detector as recited in claim 7 wherein said battery voltage is less than said previous sampled battery voltage when said down counter decrements above a zero count and wherein a peak voltage signal is provided for stopping a battery charging process.

9. The peak voltage and peak slope detector as recited in claim 8 wherein said zero count of said down counter enables said up counter for counting any other pulses from said VFC during said predetermined time period.

10. The peak voltage and peak slope detector as recited in claim 9 further including a second counter comparator for counting said Carry signals over a predetermined number of battery voltage sample sequences.

11. The peak voltage and peak slope detector as recited in claim 10 wherein said second counter comparator compares said pulse count corresponding to said rate of voltage change against a previous pulse count corresponding to a previous rate of voltage change and wherein a peak slope signal is provided indicating a peak slope has occurred when said pulse count is less than a previous pulse count of said second counter comparator.

12. A peak voltage and peak slope detector circuit for a battery charger circuit comprising:

a Voltage To Frequency Converter (VFC) having a first input coupled to a battery being charged and an output;

a logic circuit having a first input coupled to said output of said VFC, a second input, and an output;

a first counter comparator having a first input coupled to said output of said logic circuit, a second input, a Peak Voltage output, an Overvoltage output, and a Carry output; and a timer circuit having a first output coupled to said second input of said logic circuit, a second output coupled to said second input of said counter comparator, and a Power Down output for turning off the battery charger circuit prior to a battery voltage sampling sequence wherein said timer circuit provides a signal to said logic circuit for gating a VFC signal for a predetermined time period to said first counter comparator and wherein said first counter comparator generates a pulse count of said VFC signal during said predetermined time period, said pulse count corresponds to a voltage magnitude of said battery, said first counter comparator comparing said pulse count against a previous pulse count for determining when a voltage peak occurs.

13. The peak voltage and peak slope detector circuit of claim 12 wherein said logic circuit comprises an AND gate having a first input coupled to said output of said VFC, a second input coupled to said first output of said timer circuit, and an output coupled to said first input of said first counter comparator.

14. The peak voltage and peak slope detector circuit as recited in claim 12 wherein said first counter comparator comprises:

an up counter for counting pulses of said VFC signal;

a down counter; and a load logic circuit for coupling said up counter to said down counter.

15. The peak voltage and peak slope detector circuit as recited in claim 14 wherein prior to said battery voltage sample sequence said load logic circuit couples a pulse count of said up counter to said down counter for being stored therein, said pulse count of said up counter corresponding to said previous pulse count and wherein said down counter is responsive to said VFC signal during said battery voltage sample sequence, said down counter being decremented by said VFC signal during said predetermined time period.

16. The peak voltage and peak slope detector circuit as recited in claim 15 wherein said battery voltage is equal to a previous sampled battery voltage when said down counter decrements to a zero count, wherein said battery voltage is greater than said previous sampled battery voltage when said down counter decrements below a zero count, wherein a Carry signal is generated upon receiving an additional pulse after said zero count indicating said battery voltage has increased, wherein said Carry signal enables said up counter for being incremented by any additional pulses from said VFC during said predetermined time period, and wherein said battery voltage is less than said previous sampled battery voltage when said down counter decrements above a zero count, the peak voltage and peak slope detector circuit indicating a peak voltage has occurred at said Peak Voltage output after said predetermined time period.

17. The peak voltage and peak slope detector circuit as recited in claim 16 further including a second counter comparator coupled for receiving said Carry signal, said second counter comparator detecting peak slope by comparing a count of said Carry signals for a predetermined number of battery voltage sample sequences against a previous count of Carry signals wherein a peak slope is detected when said count of Carry signals is less than a previous count of Carry signals.

18. A method for detecting peak voltage and peak slope of a battery being charged, the method comprising the steps of:

converting a battery voltage to a signal wherein a pulse count of said signal over a predetermined time period corresponds to a magnitude of said battery voltage;

generating a pulse count of said signal during said predetermined time period;

decrementing a previous pulse count corresponding to a previous sampled battery voltage with said signal wherein a peak voltage is detected when said previous pulse count does not reach a zero count; and providing a Carry signal indicating said battery voltage is greater than said previous sampled battery voltage when said previous pulse count is decremented below said zero count.

19. The method as recited in claim 18 further including the steps of:

generating a count of Carry signals for a predetermined number of sampled battery voltages wherein a count of said Carry signals indicates a rate of change of said battery voltage;

comparing a previous count of Carry signals against said count wherein peak slope occurs when said count of said Carry signals is less than said previous count of said Carry signals.

\* \* \* \* \*